May 2, 1961 W. GRIENGL 2,982,816

TELEVISION CAMERAS

Filed March 28, 1958

Inventor:
Walter Griengl

By Karl W. Flocks
Attorney

United States Patent Office 2,982,816

Patented May 2, 1961

2,982,816

TELEVISION CAMERAS

Walter Griengl, Antony, France, assignor to Compagnie pour la Fabrication des Compteurs et Materiel d'Usines à Gaz, Montrouge, France, a French joint-stock company Filed Mar. 28, 1958, Ser. No. 724,564

Claims priority, application France Oct. 8, 1957

3 Claims. (Cl. 178—7.2)

The present invention relates to improvements in television cameras, and more particularly to improvements in the operation of camera or pick-up tubes having a photo-conductive target, for example of the vidicon type, provided in such cameras.

It is known that when a slow scanning-vidicon tube is used, some difficulties are encountered in amplifying the video-signals emitted by this tube and that, in practice, a D.C. amplifier is nearly always required.

Since the voltage supply fluctuation of the pick-up tube, even featuring the best stabilisation up to a few millivolts, precision, is of the same order of magnitude as the video-signals, there is a danger of saturation of the intermediate stages, thus making a stable operation impossible.

The aim of the present invention is to overcome these drawbacks, with the use of a simple and stable A.C. amplifier, without any alteration of the design of the tube being necessary.

One object of the invention is to modulate the scanning beam of the slow scanning vidicon, in accordance with a carrier frequency, thus eliminating the need of amplifying very low frequencies and eliminating the effects of the vidicon voltage supply fluctuation.

Another object of the invention is to align the signals emitted by the vidicon and to eliminate the non-modulated portion, slightly below the black-level.

A still further object of the invention is to modulate the scanning beam in accordance with a carrier frequency of the on-and-off type, with the help of rectangular signals.

The invention will be better understood on reading the following description with reference to the accompanying drawings, given by way of example and without limiting the scope of the invention.

Figure 1:
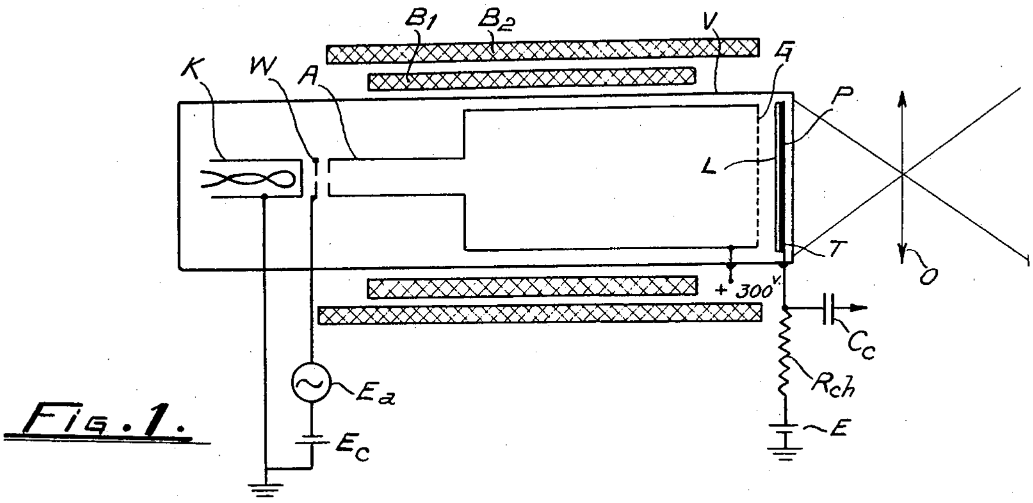
Figure 1 shows a pick-up tube of the vidicon type used in accordance with the invention.

In Figure 1, diagrammatically embodying a vidicon tube V, the image of the scene to be transmitted is projected on to the tube target T by means of a lens O. This target consists, as usual, of a conductive transparent signal-plate P coated with a photo-conductive layer L having a thickness of a few microns. The signal-plate P is connected across the load-resistance $R_{ch}$ to a suitable bias source E. A difference of potential is thus obtained on either side of the layer L, and when a part of said layer, which is substantially insulating in the dark, is lit, it becomes conductive and positive charges are shifted from the conductive layer towards the surface, which results in the production of a relief of positive charges. This relief is scanned by electron beams emited by the cathode of the electron gun and deflected by the deflection coils $B_1$. These electrons, after passing through the control electrode W, are accelerated by an anode A which is raised to a potential of about 300 v. and, in the vicinity of the target T, ends with a fine grid G which is raised to the same potential. This anode A is by-passed by a grounded condenser. A coil $B_2$ producing a field parallel to the axis of the tube V, provides for the concentration of the electron beam along the whole of the path thereof.

According to an essential feature of the invention, a source of alternating voltage or a source of rectangular signals $E_a$ is connected in series with a source of continuous bias voltage $E_c$ between the cathode K and the Wehnelt W, so as to modulate the intensity of the electron beam emitted by the cathode, in accordance with a carrier frequency.

It has already been suggested to modulate the beam of pick-up tubes of the iconoscope, supericonoscope or orthicon types by means of a high frequency wave. However, this method has been very seldom used, as the capacities between the target and the control electrode are rather high, the required carrier frequencies are high and the modulation voltage applied to the control electrode is rather high, so that the shielding of the target and of the inlet to the pre-amplifier against parasitic radiations of the carrier frequency is rendered difficult, if not impossible.

The applicant has found several reasons why the modulation of the beam in a pick-up tube of the slow-scanning vidicon type, or in any other kind of pick-up tube comprising an electrostatic screen between the control electrode and the target, is advantageous and free from the aforesaid drawbacks.

Amongst these reasons, the following may be cited:

(*a*) The scanning being of a slow type, the pass-band is narrow and the carrier frequency can be selected fairly low, which results in a decrease of the effects of parasitic capacity and radiations.

(*b*) A tube of the vidicon type or of the aforementioned type having an electrostatic screen, operates with slow electrons. On the other hand, since the anode voltage is very low (about 300 v.), the control voltage of the Wehnelt needed to cut out the beam is reduced to about 10 v., thus resulting in a weakening of the interference signal.

(*c*) The vidicon tube or any other pick-up tube of the above described type, contains a fine grid located in front of the target and held at a fixed potential. This grid acts as a screen and helps to substantially decrease the parasitic capacity between the Wehnelt and the target, the result being that a simple shield of the target and of the pre-amplifier input is sufficient.

In spite of the aforesaid advantages, there exists a limitation of the results obtainable with the method of modulating the electron beam in accordance with a carrier frequency, according to the invention; this limitation arises from the fact that the white to black amplitude range of the carrier frequency does not exceed about 20%, due to the low scanning speed of the electron beam.

Figure 2:
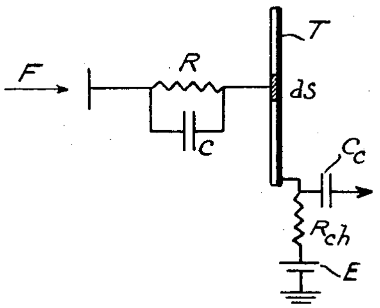
Figure 2 shows an element of the target and illustrates the operation thereof.

Referring to the explanatory diagram of Figure 2, it can be seen that an element *d*S of the target surface T, when scanned by the electron beam F, may be assimilated to a resistor R mounted in parallel with a small capacitor C.

Considering, on the one hand that this resistor R has not an infinite value when the element *d*S is not lit, and on the other hand, that the load resistance $R_{ch}$ is very high, there develops across the terminals $R_{ch}$, even in the dark, a potential difference having the modulation frequency of the beam. The vidicon output signal then takes the shape shown in Figure 3, the lines N and B showing the black and white levels respectively.

According to a further feature of the invention, the purpose of which is to avoid saturation of the last stages of the amplifier, and also to increase the white to black amplitude range, there is effected a clamping of the signal bases by which the signals are set at a same reference potential; then the non-modulated portion is clipped slightly below the black level; finally the auxiliary carrier frequency is eliminated by filtering.

Figure 3:
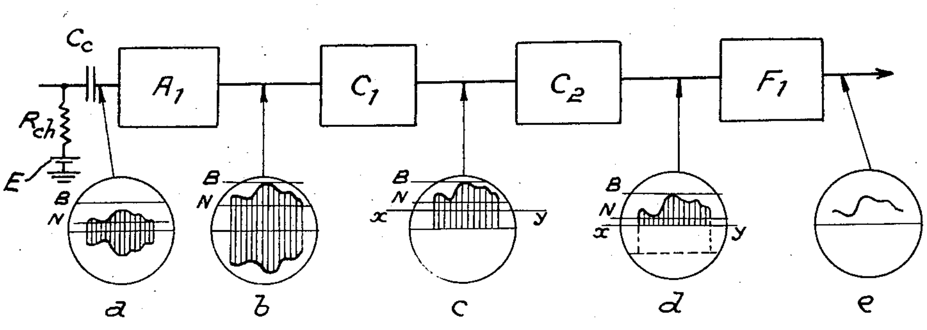
Figure 3 shows the pre-amplifier of the camera, according to the invention, in the form of block-diagrams.

The circuit which enables this feature of the invention to be applied is shown by way of a block-diagram in Figure 3, in which is also illustrated the shape of the signals at the various stages of the circuit.

The signals *a* emitted by the tube, are transmitted, through the coupling condenser $C_c$, to an A.C. amplifier $A_1$, for example of the resistance-capacity type. The amplified signals, which take then the shape *b*, are then transmitted to a D.C. restorer circuit $C_1$ which sets the base of the amplified signals at a predetermined potential. The thus obtained signals *c* are sent to a detection and clipper circuit $C_2$, which eliminates the lower non-modulated portion of the signals, along the line *xy*, slightly below the black level N, the signals taking then the shape *d*. These clipped signals *d* are then applied to a filter $F_1$ which eliminates the A.C. carrier frequency and delivers video-signals having the shape *e*.

D.C. restorer circuits $C_1$ are well known in the art, as described in No. 18 of the M.I.T. collection "Vacuum Tube Amplifier," page 96, and also in the work of Terman, "Radio Engineers Handbook," page 554.

It is to be observed that the invention can be used in connection with a pick-up tube of any kind, provided that said tube comprises an electrostatic screen between the control electrode and the target.

What I claim is:

1. In a slow scanning television camera comprising a pick-up tube having a photo-conductive target of the vidicon type, an electron beam emitting cathode and a Wehnelt, a source of alternating voltage connected in series with a source of continuous bias voltage between the cathode and the Wehnelt of the pick-up tube, adapted to modulate, in accordance with a carrier frequency, the electron beam emitted by said cathode; and a narrow band multistage A.C. amplifying chain comprising a first stage providing for the amplification proper of the signals emitted by the pick-up tube; a second stage comprising a D.C. restorer circuit setting the base of the signals amplified in the preceding stage at a predetermined reference potential; a third clipper stage eliminating the lower non-modulated portion of the signals, along a line located slightly below the black level; and a fourth detection stage eliminating by filtering the auxiliary carrier frequency and emitting the video-signals.

2. A slow scanning television camera comprising a pick-up tube having a photo-conductive target of the vidicon type, an electron beam emitting cathode, a control electrode for controlling the beam from said cathode, a source of alternating voltage connected in series with a source of continuous bias voltage between said cathode and said control electrode and adapted to modulate the electron beam emitted by said cathode in accordance with a carrier frequency, said carrier frequency having a duration of positive alternation equal to the duration of negative alternation, and a multistage A.C. amplifying chain receiving the signals emitted by the pick-up tube to transform them into video signals.

3. A slow scanning television camera comprising a pick-up tube having a photo-conductive target of the vidicon type, an electron beam emitting cathode, a control electrode for controlling the beam from said cathode, a source of alternating voltage connected in series with a source of continuous bias voltage between said cathode and said control electrode and adapted to modulate the electron beam emitted by said cathode in accordance with a carrier frequency, said carrier frequency having a duration of positive alternation equal to the duration of negative alternation and a narrow band multistage A.C. amplifying chain receiving symmetrical signals emitted by said pick-up tube to transform them into video signals.

References Cited in the file of this patent

UNITED STATES PATENTS

| | | |
|---|---|---|
| 2,220,977 | Seeley | Nov. 12, 1940 |
| 2,532,793 | Sziklai | Dec. 5, 1950 |
| 2,892,027 | Carpenter | June 23, 1959 |